July 20, 1965

H. W. CRETSINGER 3,195,745

SAFETY STORAGE TRAY

Filed Feb. 1, 1963

INVENTOR.
HIRAM W. CRETSINGER

BY Digger, Bradlock, Johnson & Westman

ATTORNEY

July 20, 1965 H. W. CRETSINGER 3,195,745
SAFETY STORAGE TRAY
Filed Feb. 1, 1963 2 Sheets-Sheet 2
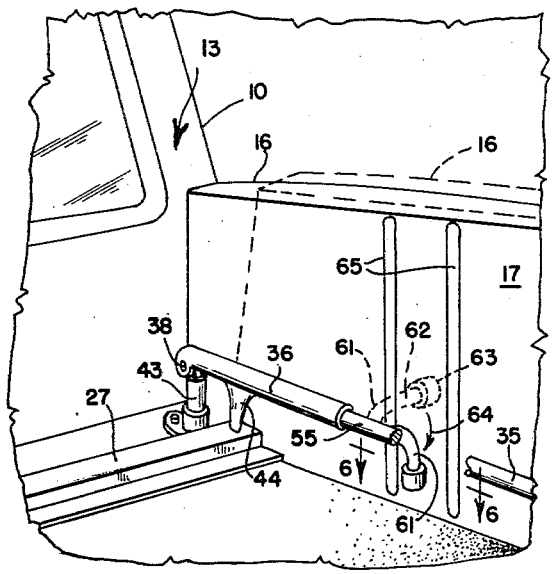
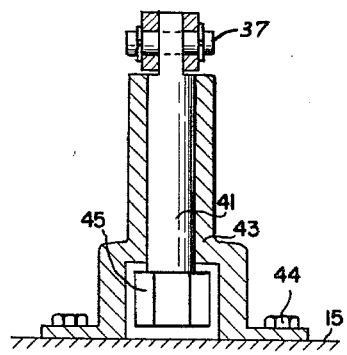
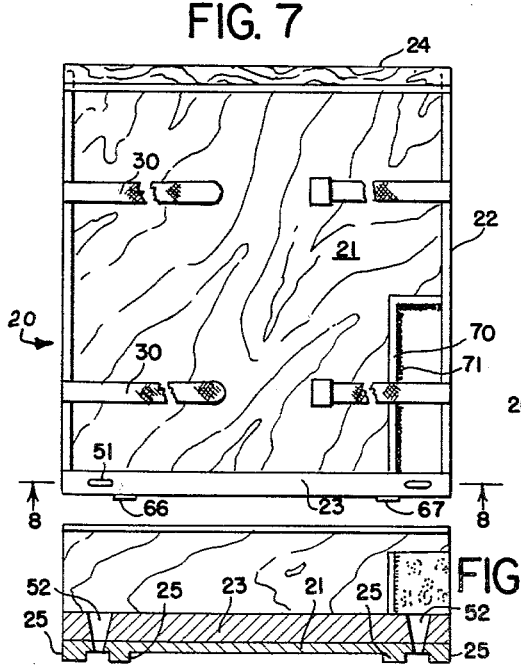
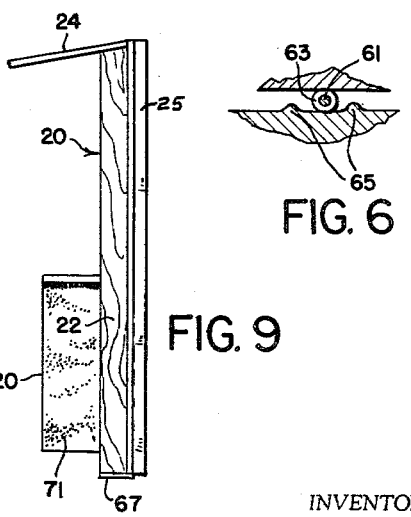
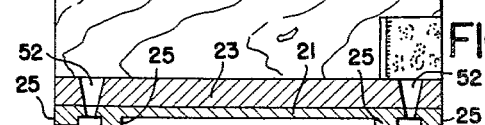
INVENTOR.
HIRAM W. CRETSINGER
BY
Dugger, Bradlow, Johnson & Westman
ATTORNEYS

United States Patent Office 3,195,745
Patented July 20, 1965

3,195,745
SAFETY STORAGE TRAY
Hiram W. Cretsinger, 1401 S. 1st St., Redfield, S. Dak.
Filed Feb. 1, 1963, Ser. No. 255,529
5 Claims. (Cl. 214—83.24)

The present invention has relation to storage trays for vehicles and more particularly to a tray which is adapted to be placed in the storage compartment of a station wagon and hold items of luggage, boxes or other carried items to keep them from moving and from causing possible injury to the occupants in the case of an accident.

With the current rise of the use of station wagons for carrying heavy objects, such as salesman sample cases or luggage, there has been a recurring problem of having these objects cause injury to the occupants of the station wagon if the station wagon has to stop suddenly or is involved in an accident. The loose items in the back storage compartment of the station wagon fly forwardly and can cause very serious injuries. Also if the items are not held they slide back and forth within the compartment under inertia forces as the car moves and can become damaged.

There have been some attempts at using trays for ease of loading station wagons, but no one has yet advanced a storage tray which will hold the articles positively locked and will hold the tray securely in place within the wagon.

The tray of the present invention, in the form as disclosed, is mounted on suitable slides or runners and can be slid rearwardly out onto the tail gate of the station wagon for easy loading, slid forwardly into position for carrying and locked in this position, or can be adapted to be slid over the back of the second seat of the wagon (when it is folded downwardly) to permit easy access to a tire carrying compartment of a wagon.

Thus the tray not only serves as a safety device for the occupants but permits ease of loading and ease of operation of the wagon.

The locking device of the safety tray is such that it has to be positively positioned before the tail gate can be closed. Thus it avoids accidental unlocking during movement of the wagon. The locking device holds the tray securely and prevents it from going forwardly or upwardly. The locking device is easily released when the tray is to be unloaded.

The tray is rigid in structure, easily manufactured and low cost.

It is an object of the present invention to present an easily loaded safety storage tray for use with station wagons.

In the drawings,

FIG. 4 is a fragmentary enlarged sectional view taken as on line 4—4 in FIG. 2;

FIG. 5 is a fragmentary front perspective view of a rear portion of the station wagon showing the locking mechanism in position;

FIG. 6 is a fragmentary sectional view taken as on line 6—6 in FIG. 5;

FIG. 7 is a top plan view of a station wagon safety tray made according to the present invention;

FIG. 8 is a sectional view taken as on line 8—8 in FIG. 7; and

FIG. 9 is a side elevational view of the safety tray of FIG. 7.

Figure 1:
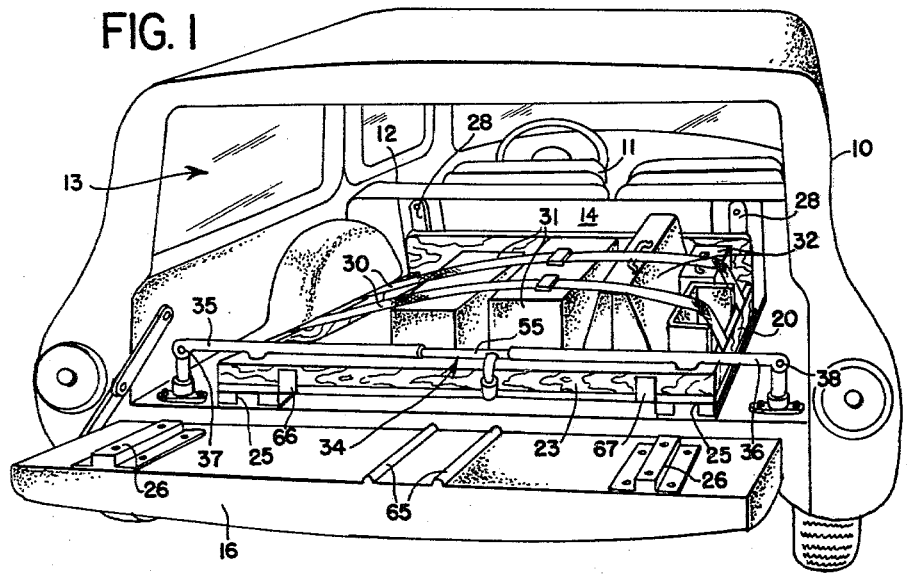
FIG. 1 is a fragmentary rear perspective view of a station wagon illustrating a safety storage tray made according to the present invention installed therein.

Referring to the drawings and the numerals of reference thereon, a station wagon 10 of conventional design has a front seat 11, a second seat 12 and a rear storage compartment 13. The second seat has a back member 14 which is adapted to pivot downwardly when in non-usable position. This in effect enlarges the storage area in the conventional manner. The storage compartment 13 has a floor 15. A tail gate 16 is hingedly attached to the station wagon body and is adapted to fold so that the inside surface 17 of the tail gate will come to position substantially coplanar with the floor 15 of the storage compartment.

A station wagon safety storage tray illustrated generally at 20 is comprised of a bottom panel 21, a pair of spaced side panels 22, 22, an end panel 23 joining the side panels and a front panel 24. The underside of the bottom panel 21 is provided with two parallel U-shaped channels, each formed by two guide members 25, 25 that are fixed to the bottom surface or bottom panel 21.

Figure 2:
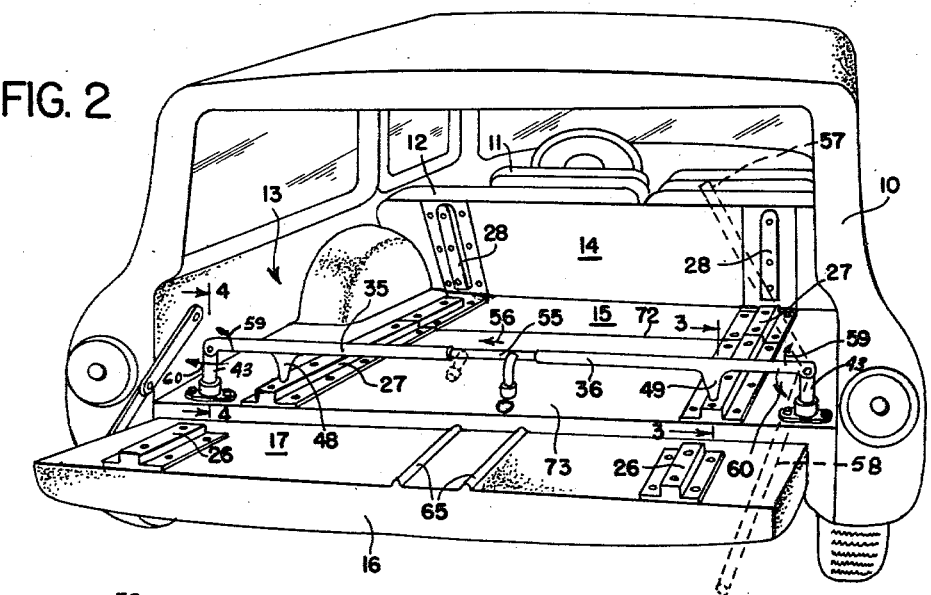
FIG. 2 is a view taken substantially on the same line as FIG. 1 with the safety storage tray removed from the station wagon.

A pair of spaced, parallel tail gate track members or slides 26, 26 are fixedly attached to the inside surface 17 of the tail gate 16. The track members are spaced the same distance apart as the channels of the tray. A pair of main track members 27, 27 are fixedly attached to the bottom 15 of the storage compartment 13 of the station wagon and a pair of forward track members 28, 28 are fixedly attached to the back surface of the back member 14 of the second seat of the station wagon. The track members are arranged to form two aligned tracks extending along the length of the continuous surface which comprises the storage compartment, open tail gate and folded second seat of the station wagon. The main tracks 27, 27 are in two sections, as will be more fully explained later. As seen in FIG. 2, when the back member 14 of the second seat 12 is in its up position the track members 28, 28 will extend upwardly. However, when the back member 14 is folded down, the track members 28, 28 will be aligned with and on the same plane as the other track members 27, 27 and 26, 26.

The safety tray 20 is adapted to be placed over and slide upon the track members. The guides 25, 25 fit alongside their corresponding track members and prevent the tray from cocking or binding on the members. The tray slides forwardly and rearwardly along these members under hand pressure.

The tray 20 is provided with a pair of load fastening straps 30, 30. The straps 30 are attached between the side walls 22, 22 and extend transversely thereto. The straps have suitable buckles or fastening means for adjusting them. The straps 30 are adapted to hold articles such as boxes 31 or suitcases 32 securely down onto the floor of the safety tray when they are in proper position.

When the tray is in its normal usable position within the storage compartment 13, as shown in FIG. 1, it is positively locked in place with a locking mechanism illustrated generally at 34. The locking mechanism comprises two tubular members 35 and 36, respectively. The tubular members are each pivotally attached about a substantially horizontal axis, at at 37 and 38, respectively, to one of a pair of upright swivel rods 41, 41. The swivel rods 41 are each rotatably mounted on a separate upright bracket 43, 43 which in turn is fixedly mounted with bolts 44 to the floor 15 of the storage compartment. The rods 41 each have an enlarged portion 45 which prevents them from pulling longitudinally out of their bracket 43 and yet permits them free rotation within the brackets about a substantially vertical axis.

Figure 3:
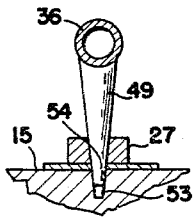
FIG. 3 is a fragmentary enlarged sectional view taken as on line 3—3 in FIG. 2.

Each of the tubular members 35 and 36 has a locking dog or pin 48 and 49, respectively, fixedly attached thereto. The locking dogs are adapted to fit within provided openings 51 and 52, respectively, in the rear wall or panel 23 of the safety tray. The dogs are of sufficient length, as perhaps best seen in FIG. 3, so that they extend downwardly completely through the rear panels 23, the bottom panel 21, through the aligned tracks 27 and down into a provided receptacle 52 in the floor 15 of the station wagon. In other words, an end portion 54 of each of the locking dogs is positively positioned in the floor of the station wagon. The dogs hold the end panel and the safety tray from any movement with respect to the floor of the station wagon. The edge surfaces adjacent their respective pivot or swivel posts are arcuate to facilitate removal and replacement of the dogs or pins from their provided receptacles.

The two tubular members 35 and 36 of the locking mechanism are held together with a latch bar 55 which is slidably mounted in tubular member 35 and also in tubular member 36. As can be seen in FIG. 2, the latch bar is movable in direction as indicated by arrow 56 so that an end portion of the latch bar clears tubular member 36. Then the tubular members, when they are separated, can be pivoted upwardly as shown by arrows 59, 59 in FIG. 2 and in dotted lines at 57, and the latch dogs 48 and 49 will clear the top of the end panel of the safety tray. The tubular members can then be pivoted rearwardly as shown by arrows 60, 60 and in dotted lines at 58 in FIG. 2 to position clear of the safety tray. The safety tray can then be slid rearwardly out of the storage compartment of the station wagon onto the track members 26, 26 on the tail gate and can be easily loaded or unloaded.

Once the tray is loaded and the straps 30, 30 are secured in place the tray can be slid back into the storage compartment 13 of the station wagon. However, before the tail gate can be closed the latching mechanism has to be in place. For example, with the tubular members pivoted rearwardly as shown in dotted lines at 58 in FIG. 2, the tail gate cannot be closed at all. The tubular members have to be placed with the latch dogs positioned within their provided openings 51, 52 in the end panel 23 of the safety tray and then the latch bar 55 can be slid in direction opposite from that indicated by arrow 56 so that opposite end portions of the latch bar are in each of the tubular members. This makes the tubular members a rigid continuous structure and will prevent movement of the safety tray in any direction with respect to the floor or bottom surface of the storage compartment.

One other safety feature is involved with the latch mechanism. As shown in FIG. 5 the latch bar 55 has a handle member 61 that is fixedly attached to the latch bar. The handle member 61 is grasped for moving the latch bar longitudinally within the tubular members. If the latch bar is left in a position wherein it could work loose during movement, for example as shown in dotted lines at 62 in FIG. 5, the tail gate will not close. In other words, the end tip member 63 of the latch bar handle will contact the inner surface 17 of the tail gate and will prevent the tail gate from closing all the way. However, when the latch bar handle 61 has been moved downwardly in direction as indicated by arrow 64, the tip member 63 is clamped between the end panel 23 of the safety tray and the inner surface 17 of the tail gate 16. Also as can be seen the tail gates on most station wagons have a plurality of ribs, for example ribs 65, 65. With the tip member 63 positioned between the two rib members 65, 65 it is prevented from moving longitudinally in direction as indicated by arrow 56 a sufficient distance so that it can become unlatched and release the tubular members. Thus the unit is positively locked whenever it is in place and is designed so that it will remind the operator of the automobile that it has to be locked. In other words, the tail gate will not close until the latch bar has been properly positioned.

Referring specifically to FIG. 2 it will be seen that the tracks 27, 27 are split along a dividing line 72 where a tire compartment door 73 is located. In other words, a portion of the tracks 27, 27 will come out with a tire compartment door 73. When it is desired to get into the spare tire compartment beneath the compartment door 73 and a loaded tray 20 is in place, the second seat 12 is folded so that the back member 14 is flat or coplanar with the bottom 15 of the storage compartment. The locking bar for the tray is then released and the tray merely slid forwardly onto tracks 28, 28 so that it clears the tire compartment door. The door can be removed and the spare tire taken out for necessary changing with very little fuss. This is particularly important where a tire must be changed in rain or snow. The load carried in the storage compartment does not have to be set on the ground nor does a great deal of time have to be spent in unloading the cargo, changing the tire, then reloading the cargo. It is immediately apparent that the advantages of this system are tremendous when viewed in the light of the results obtained.

Loading and unloading of the tray is very convenient, the tray is merely pulled out onto the tail gate and the cargo removed from the tray. This, in addition to the easy removal of the spare tire and the safety feature of a cargo tray to prevent injury to people riding in the front seat when they are carrying heavy objects, make the device very desirable to have in station wagons.

The locking bar maintains the tray rigidly held against the bottom of the station wagon to prevent any incidental movements. The locking bar is sufficiently strong to hold the tray even in the most severe of accidents.

The locking mechanism prevents the tray from moving forwardly or upwardly when the car stops suddenly or when it is involved in an accident. The occupants of the car are thus protected from injury. The straps 30, 30 hold the large objects down in the safety tray and insure that they do not move around. In addition, it can be seen that the front panel 24 of the safety tray is large. If there are objects on the tray that are not securely held by the straps they will move against the front panel and will be prevented from going further forwardly.

The rear panel of the box is reinforced with metal straps 66 and 67, respectively and also these straps can be run underneath the box or storage tray to insure a good connection between the end panel and the bottom panel. It should be noted that in the disclosure shown the unit is made of suitable wood, the runners or tracks being made of waxed hardwood. However, it is to be understood that the tray can be made of any suitable material, such as light metal, fiberglass or wood.

If desired, as shown in FIG. 7 the storage tray can be divided with suitable upright dividers 70 and the inside of the dividers can be lined with a resilient material, for example carpeting indicated at 71. This will hold small objects within the dividers from moving under force and will keep everything secured tightly.

Partitions are particularly adapted for use by salesmen, as they generally have certain items such as sample cases, with them at all times. By having suitable dividers in the safety tray the sample cases are always held properly and securely. The sample cases are many times extremely heavy and thus any accident could cause them to do extensive damage without the safety tray of the present invention.

What is claimed is:

1. In a station wagon having a rear storage compartment, a tail gate opening for said rear compartment, a tail gate member for closing said tail gate opening, said tail gate member being hinged at a lower portion thereof and movable to have a surface substantially coplanar with the surface of said storage compartment, of: a pair of guide rails fixedly attached to said surface of said storage compartment and the surface of said tail gate, a storage tray slidably mounted on said guide rails, said storage tray being movable from a first position within said station wagon to a second position substantially outside of the main body of said station wagon, and lock means to hold said tray including an elongated lock member movable to locked position overlying a portion of said tray with said tray in its first position, a latch dog on said lock member which passes through a portion of the tray into the floor of the storage compartment when said lock member is in its locked position, and a latch bar slidable from a lock member retaining position to a released position.

2. The combination as specified in claim 1 and means to hold the latch bar in its first position when said tail gate is closed.

3. In a station wagon having a rear storage compartment, a tail gate opening for said rear compartment, a tail gate member for closing said tail gate opening, said tail gate member being hinged at a lower portion thereof and movable to have a surface substantially coplanar with the surface of said storage compartment, of: a pair of guide rails fixedly attached to said surface of said storage compartment and the surface of said tail gate, a storage tray slidably mounted on said guide rails, said storage tray being movable from a first position within said station wagon to a second position substantially outside of the main body of said station wagon, and a locking device comprising a pair of upright posts rotatably mounted with respect to the floor of the station wagon compartment adjacent opposite sides of said storage tray and adjacent the rear portions thereof, a pair of tubular members, one pivotally mounted to each of said posts, a latch bar slidably mounted within said tubular members, said latch bar being adapted to move to a position wherein it clears one of said tubular members, a pair of latching dogs, each fixedly attached to one of said tubular members and adapted to extend through a portion of said tray into the floor of said storage compartment, said latch bar being adapted to move to position wherein it is partially within each of said tubular members and holds them in locked position.

4. In a station wagon having a rear storage compartment, a tail gate opening for said rear compartment, a tail gate member for closing said opening, said tail gate member being hinged at a lower portion thereof and movable to have a floor surface substantially coplanar with the surface of said storage compartment, of: a pair of guide rails fixedly attached to said surface of said storage compartment and the surface of said tail gate, a second seat in said station wagon immediately ahead of said storage compartment, said second seat being foldable to form a surface substantially coplanar with the floor surface of said storage compartment, a pair of guide rails on the surface formed by said second seat aligned with the rails within said storage compartment, a storage tray slidably mounted on said guide rails, said storage tray being movable from a first normal position within said station wagon and behind said second seat to a second position substantially outside of the main body of said station wagon, and further being slidable forwardly of its normal position when said second seat is folded, and a locking device for holding said tray in its normal position comprising a pair of upright posts rotatably mounted with respect to the floor of the station wagon compartment adjacent opposite sides of said storage tray and adjacent the rear portions thereof, a pair of tubular members, one pivotally mounted to each of said posts, a latch bar slidably mounted within said tubular members, said latch bar being adapted to move to a position wherein it clears one of said tubular members, a pair of latching dogs, each fixedly attached to one of said tubular members and adapted to extend through a portion of said tray into the floor of said storage compartment, said latch bar being adapted to move to position wherein it is partially within each of said tubular members and holds them in locked position.

5. The combination as specified in claim 4 wherein said latch bar is held to prevent longitudinal movement thereof when said tail gate is closed.

References Cited by the Examiner
UNITED STATES PATENTS

| | | | |
|---|---|---|---|
| 2,284,419 | 5/42 | Greig | 214—83.24 X |
| 2,521,727 | 9/50 | Kappen | 214—84 |
| 2,605,064 | 7/52 | Davis | 214—83.24 X |
| 2,643,395 | 6/53 | Stassinos | 214—83.24 |
| 3,006,487 | 10/61 | Gelli | 214—83.24 |
| 3,007,423 | 11/61 | Maharick | 105—368 X |
| 3,084,816 | 4/63 | Bozio | 214—83.24 |

HUGO O. SCHULZ, *Primary Examiner.*
GERALD M. FORLENZA, *Examiner.*